Patented Apr. 15, 1924.

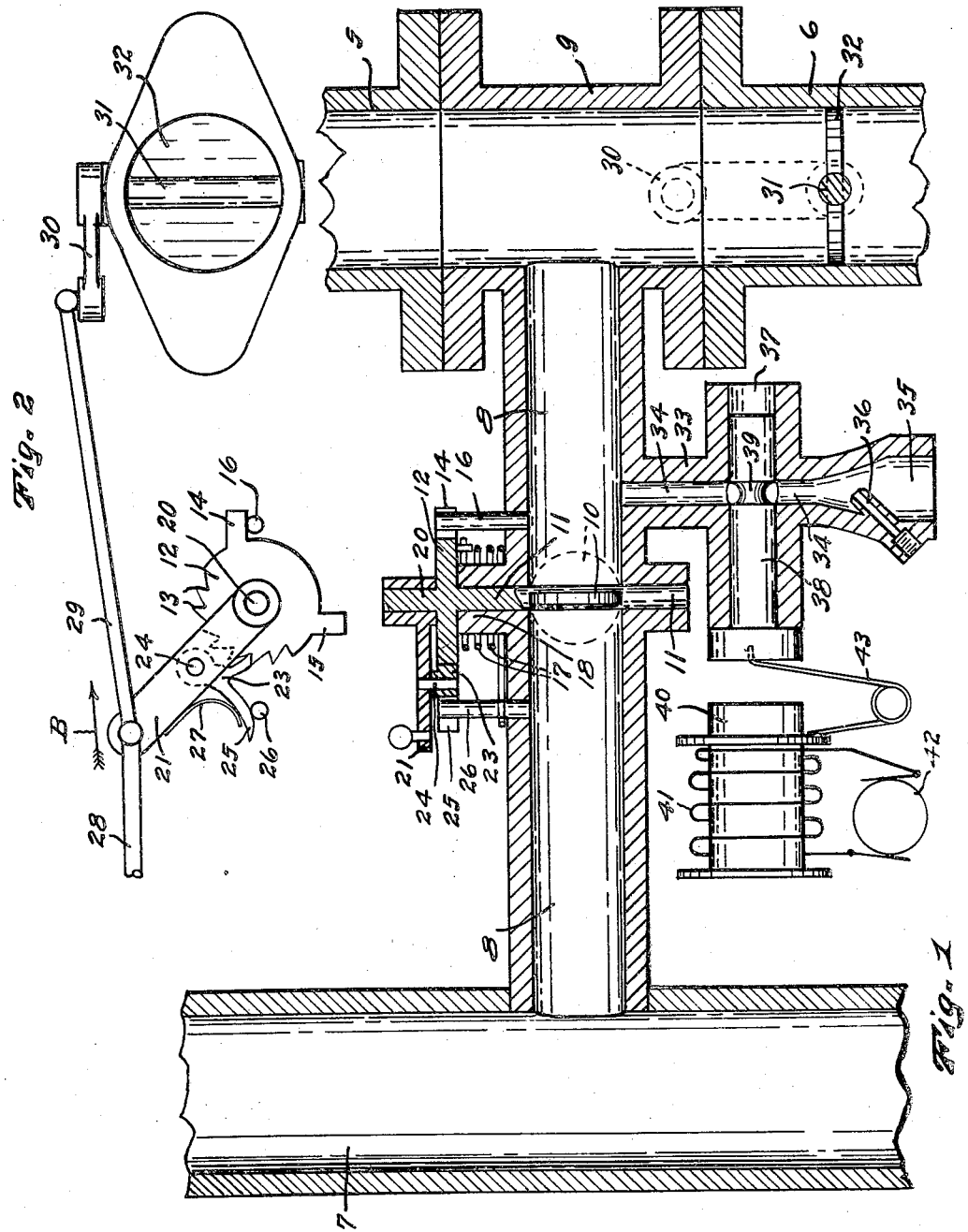

1,490,388

UNITED STATES PATENT OFFICE.

WALTER J. HARKIN, OF SEATTLE, WASHINGTON.

COMPRESSION STABILIZING AND FUEL-SUPPLY DEVICE FOR INTERNAL-COMBUSTION ENGINES.

Application filed April 17, 1922. Serial No. 554,040.

*To all whom it may concern:*

Be it known that I, WALTER J. HARKIN, a citizen of the United States, and a resident of Seattle, in the county of King and State of Washington, have invented certain new and useful Improvements in Compression Stabilizing and Fuel-Supply Devices for Internal-Combustion Engines, of which the following is a specification.

My invention relates to improvements in compression stabilizing and fuel supply means for internal combustion engines and the object of my improvement is to provide devices of this nature that are capable of installation on any internal combustion engine either old or new and that will greatly increase the efficiency of the engine by effecting a saving in fuel, affording more power and causing the engine to run more smoothly.

Another object is to provide devices of this nature that will maintain a substantially uniform compression within the engine cylinders for all speeds of the engine and for all adjustments or openings of the main throttle valve said substantially uniform compression being maintained by permitting burned exhaust gases to be drawn in with the fuel charge when the main throttle valve is closed or partly closed, thus permitting the cylinder to be always filled with gas at substantially the same pressure at the end of the intake stroke so that the compression will always be substantially the same at the time of firing. The apparatus used for stabilizing the compression includes devices for gradually opening a passageway between the fuel inlet manifold and the exhaust manifold of an internal combustion engine as the main butterfly or throttle valve is closed.

Another object is to provide electrically controlled apparatus apart from the main carbureter for supplying fuel and air for low speed or idling purposes of the engine, said low speed fuel supply apparatus including an electrically controlled valve that is adapted to be automatically opened and closed at a predetermined speed of the engine, said valve being opened as the speed of the engine increases.

Other and more specific objects will be apparent from the following description taken in connection with the accompanying drawings.

In the drawings, Figure 1 is a sectional view illustrating apparatus constructed in accordance with my invention, parts being shown diagrammatically.

Figure 2 is a detached plan view of parts of the apparatus shown in Figure 1.

Like reference numerals designate like parts throughout the several views.

Referring to the drawings, the numeral 5 designates a fuel inlet manifold, 6 designates the upper position of a carbureter and 7 designates an exhaust conduit all of which may be of any well known form of construction and may be connected in the usual manner with an internal combustion engine, not shown.

In carrying out the invention I employ a tubular conduit or pipe 8 that is connected at one end with the exhaust conduit 7 and at the other end with a block or fitting 9 which is arranged to be interposed between the end of the inlet manifold 5 and the carbureter body 6.

Disposed within the conduit 8 and controlling the flow of gas therethrough is a valve 10 of the disc or butterfly type that is secured to a stem 11 that projects outwardly though the side of the conduit 8 and terminates in a rigidly connected or integral plate 12 having ratchet teeth 13 on a portion of its periphery and having two stop members 14 and 15 projecting outwardly therefrom at an angle of substantially ninety degrees with respect to each other on the side removed from the ratchet teeth, the stop members being arranged to strike against a fixed stop or post 16 that projects upwardly from the side of the conduit 8. A spring 17 which is coiled about the hub 18 through which the valve stem 11 passes is provided for the purpose of urging the valve 10 into a closed position.

The ratchet plate 12 has an upwardly protruding centrally arranged bearing stud 20 upon which a lever arm 21 is mounted for oscillation. The lever arm 21 has a pawl 23 secured thereto by a pivot 24 and arranged to engage with the ratchet teeth 13 and turn the valve stem 11 in one direction only. The pawl 23 has an outwardly protruding trip member 25 that is arranged to strike against a relatively fixed stop 26 to throw such pawl out of engagement with the ratchet teeth 13 and such pawl is engaged by a spring 27 that yieldingly urges it into engagement with the ratchet teeth.

The outer end of the lever arm 21 is connected with two links 28 and 29, the link 28 leading to and being connected with any suitable control or operating mechanism as a foot or hand throttle, not shown, and the link 29 being connected with the outer end of a lever arm 30 that is secured to the stem 31 of a valve disc 32 that is disposed within the carbureter body 6 between a carbureter, not shown, and the fitting 9, said valve disc 32 being the main throttle or butterfly valve that controls the inlet of fuel and air to an internal combustion engine.

In operation when an engine on which this compression stabilizing device is installed is stopped or is idling at slow speed the main throttle valve 32 and the valve disc 10 will ordinarily both be closed. As the throttle valve 32 is opened by moving the lever arm 21 in the direction indicated by arrow B the speed of the engine will increase in proportion to the opening of the throttle valve and the compression will remain substantially constant. As the lever arm 21 is moved in the direction indicated by arrow B the pawl 23 will ride over the ratchet teeth 13 but will not open the valve 10. If, after the main throttle valve 32 has been partially or entirely opened and the engine speeded up, the lever arm 21 is moved in a direction opposite to that indicated by the arrow B to partially or entirely close the main throttle valve the pawl 23 will engage with the ratchet teeth 13 and open the valve disc 10 thus allowing dead or inert exhaust gas to pass from the conduit 7 into the inlet manifold 5 where it will be mixed with the fuel gases to heat and gasify the same and to supply the volume of gas necessary to keep the compression substantially uniform. After the device is in operation and the pawl 23 has moved over and engaged with the ratchet teeth 13 lever 21 may be moved to increase or decrease the opening of the main throttle valve 32 in the usual manner and the compression compensating valve 10 will be moved in the reverse direction to the main throttle valve 32; that is, as the valve 32 opens the valve 10 will close and as the valve 32 closes the valve 10 opens, the result being that as the throttle valve 32 is opened to increase the speed of the engine the simultaneous closing of the valve 10 diminishes the available supply of inert gas and thus causes a richer mixture to be drawn into the engine and conversely as the throttle valve 32 is closed the valve 10 opens, thus increasing the available supply of inert or burned gas and thereby diluting the fuel mixture and at the same time furnishing the necessary volume for maintaining a substantially uniform compression. When the lever arm 21 is moved far enough to the left to completely close the main throttle valve 32 the trip member 25 on the pawl 23 will strike the post 26 and move the pawl out of engagement with the ratchet teeth 13 thereby permitting the spring 17 to close the valve 10, the arm 14 striking against the post 16 and stopping the valve 10 in the closed position. Engagement of the arm 15 with the pawl 23 prevents the valve 10 from being moved past the full open position.

Connected with the conduit 8 between the fuel inlet end and the valve 10 is a fitting 33 having a combined fuel and air passageway 34 that flares at its outer end as at 35 and that is provided within the flared portion with a nozzle 36 through which fuel as gasoline may be supplied. The passageway 34 is intersected, preferably at right angles, by a cylindrical valve chamber 37 in which is disposed a piston valve 38 having an annular groove 39 that may register with the passageway 34. An electromagnet 40 having a coil 41 that may be connected with a current generator 42 is disposed near the end of the valve piston 38 so that when said electromagnet is sufficiently energized it will attract the valve piston 38 and by moving the same lengthwise within the chamber 37 will close the passageway 34. A spring 43 is used to urge the valve piston away from the electromagnet 40.

The generator 42 is connected with the engine on which this apparatus is installed in such a manner as to produce within the coil 41, a current that is proportional to the speed of the engine and to consequently produce a magnetic force that varies directly as the speed of the engine is reduced to what is known as the idling speed the attraction of the magnet 40 for valve piston 38 will be overcome by the force of the spring 43 and the valve piston will be moved into the open position shown in Figure 1 thus permitting air and fuel for idling or slow speed of the engine to be taken through the passageway 34. If the speed of the engine is increased the strength of current in the coil 41 and consequently the strength of the magnet 40 will be increased and, at a predetermined speed of the engine the magnetic attraction will overcome the strength of the spring 43 and by moving the piston valve 38 will close the passageway 34 through which fuel for idling purposes is drawn in. The predetermined speed at which the valve 38 will close will preferably be between the idling speed and the working speed of the engine.

It is a well known fact that it is difficult to construct a carbureter that will function with maximum efficiency for both high speed and low speed of an engine, the usual difficulty being that if the carbureter is adjusted to give the maximum efficiency at high speeds it will not operate satisfactorily at low speeds and vice versa. This is particularly true of the less expensive and more simple types of carbureters. The use of my idling device obviates the need of a low speed adjustment of the carbureter and makes it possible to adjust for maximum efficiency at high speeds with the full assurance that the low speed or idling requirements of the engine will be taken care of.

If desired the coil 41 may be connected with a constant source of supply of electric current as with a battery and may be manually controlled by a suitably disposed switch.

At the time of starting the engine the valve 38 will ordinarily be in the open position but it will close as soon as the engine speed is increased beyond the limit at which such valve is intended to close. If, after the engine is started, the valve 10 is opened partially the engine will warm up more quickly than it otherwise would.

If the pipe 8 is allowed to terminate in the atmosphere instead of being connected with the exhaust pipe 7 air at atmospheric pressure may be admitted instead of exhaust gas as described.

The use of the heated exhaust gases in the fuel charge insures higher temperature in the cylinders by reason of higher compression and the added heat of the gases and make it possible to use a lower grade of fuel, in which instance gasolene will preferably be supplied to the low speed nozzle 36 for starting and idling.

The combination of devices herein disclosed effect a great saving in fuel, by heating and thoroughly gasifying the fuel, by stabilizing the compression, by preventing waste of fuel at low speeds and by permitting the carbureter to be adjusted to give the greatest efficiency at high speeds.

The foregoing description taken in connection with the accompanying drawings clearly discloses the plan of construction and method of operation of my compression stabilizing and idling means for internal combustion engines, but, while I have shown and described what I now consider to be a preferred form of the invention it will be understood that the disclosure is merely illustrative and that such changes in size, shape, dimensions, form of construction and general arrangement of the several parts may be resorted to as are within the scope of the following claims.

What I claim is:

1. The combination with an internal combustion engine having a fuel inlet conduit and an exhaust conduit, of a main throttle valve in said fuel inlet conduit, a by-pass conduit connecting said exhaust conduit with said fuel inlet conduit at a point between the engine and the throttle valve, a valve in said by-pass conduit and valve operating means arranged to open said by-pass valve as said main throttle valve is closed.

2. The combination with an internal combustion engine having a fuel inlet conduit and an exhaust conduit, of a main throttle valve in said fuel inlet conduit, a by-pass conduit connecting said exhaust conduit with said fuel inlet conduit at a point between the engine and the throttle valve, a valve in said by-pass conduit, and valve operating means interconnecting said two valves and arranged to open said by-pass valve as said main throttle valve is closed and to close said by-pass valve as said main throttle valve is opened.

3. The combination with an internal combustion engine having a fuel inlet conduit, of a main throttle valve in said fuel inlet conduit, auxiliary inlet means connected with said fuel inlet conduit at a point between the engine and the throttle valve, an auxiliary valve controlling said auxiliary inlet means and valve operating devices interconnecting said two valves, said valve operating devices embodying means for closing said auxiliary valve when said throttle valve is entirely closed and for permitting said throttle valve to be opened while said auxiliary valve remains closed and for causing said two valves to move in opposite directions, if, after said throttle valve is opened said throttle valve is moved between a closed position and the maximum position to which it has been opened.

4. The combination with an internal combustion engine having a fuel inlet conduit and an exhaust conduit, of a main throttle valve in said fuel inlet conduit, a by pass conduit connecting said exhaust conduit and said fuel inlet conduit at a point between the engine and the throttle valve, a by-pass valve in said by-pass conduit and valve operating means interconnecting said two valves, said valve operating means embodying mechanism for closing said by-pass valve when said throttle valve is entirely closed and devices for permitting said throttle valve to be opened while said by-pass valve remains closed and for causing said two valves to move in opposite directions if, after said throttle valve is opened, said throttle valve is moved between a closed position and the maximum position to which it has been opened.

5. The combination with an internal combustion engine, of a fuel inlet manifold, an exhaust manifold, a by-pass conduit connecting said fuel inlet manifold and said exhaust manifold, a throttle valve in said fuel inlet conduit below the point of connection of the same with said by-pass conduit, a valve in said by-pass, a valve stem secured to said valve, a ratchet plate rigid with said valve stem, ratchet teeth on said plate, means for limiting the movement of said plate, a lever arm pivoted for oscillation on the axis of said plate, a pawl pivoted to said lever arm, a spring for holding said pawl in engagement with said ratchet teeth, spring means for urging said by-pass valve into a closed position, trip means for disengaging said pawl from said ratchet teeth when said lever arm is in a position corresponding to the closed position of the throttle valve, and link means interconnecting said throttle valve and said lever arm for simultaneous operation of said two valves, said by-pass valve being arranged to be opened as said throttle valve is closed and to be closed as said throttle valve is opened.

6. The combination with an internal combustion engine having a fuel inlet conduit, of a main throttle valve in said fuel inlet conduit, auxiliary inlet means connected with said fuel inlet conduit at a point between the engine and the throttle valve, an auxiliary valve controlling said auxiliary inlet means and valve operating devices for closing said auxiliary valve when said throttle valve is entirely closed, and for permitting said throttle valve to be opened while said auxiliary valve remains closed, and for causing said two valves to move in opposite directions, if, after said throttle valve is opened said throttle valve is moved between a closed position and the maximum position to which it has been opened.

7. The combination with an internal combustion engine, of a fuel inlet manifold, a throttle valve in said fuel inlet manifold, a conduit communicating with said fuel inlet manifold between the engine and the throttle valve, a valve in said conduit, a valve stem for said valve, a toothed ratchet plate secured to said valve stem, a lever arm, a spring pressed pawl on said lever arm engaging said ratchet plate, spring means for urging said conduit pawl from said ratchet plate when said lever arm is at the limit of its closing movement, and link means interconnecting said throttle valve and said lever arm for simultaneous operation of said two valves, said conduit valve being arranged to be opened as said throttle valve is closed and to be closed as said throttle valve is opened.

WALTER J. HARKIN.